US 7,096,259 B1

United States Patent
Gray et al.

(10) Patent No.: US 7,096,259 B1
(45) Date of Patent: Aug. 22, 2006

(54) PROCESSING BY USE OF SYNCHRONIZED TUPLE SPACES AND ASSERTIONS

(75) Inventors: Thomas Gray, Carp (CA); Sergeui Mankovskii, Carp (CA)

(73) Assignee: Mitel Networks Corporation, Ontario (CA)

( * ) Notice: Subject to any disclaimer, the term of this patent is extended or adjusted under 35 U.S.C. 154(b) by 585 days.

(21) Appl. No.: 09/642,340

(22) Filed: Aug. 21, 2000

(30) Foreign Application Priority Data

Aug. 24, 1999 (GB) ................................. 9920051

(51) Int. Cl.
*G06F 15/173* (2006.01)
(52) U.S. Cl. ...................... 709/223; 709/224; 709/225; 709/232; 707/201
(58) Field of Classification Search ................ 709/238, 709/208, 202, 201, 239, 232, 213–216, 224–225; 701/201, 100, 101, 103; 711/206
See application file for complete search history.

(56) References Cited

U.S. PATENT DOCUMENTS

| | | | | |
|---|---|---|---|---|
| 5,297,265 | A | * | 3/1994 | Frank et al. ................. 711/202 |
| 5,638,494 | A | | 6/1997 | Pinard et al. |
| 5,873,071 | A | * | 2/1999 | Ferstenberg et al. .......... 705/37 |
| 5,924,103 | A | * | 7/1999 | Ahmed et al. ............... 707/201 |
| 5,963,947 | A | * | 10/1999 | Ford et al. .................... 707/10 |
| 5,974,420 | A | * | 10/1999 | Lehman et al. .............. 707/101 |

FOREIGN PATENT DOCUMENTS

| GB | WO 9932967 | 12/1980 |
|---|---|---|

OTHER PUBLICATIONS

Search Report of Great Britain Application No. 9920051.1.
INSPEC Abstract No. C9806-6110P-013 & Proc. 30th Hawaii International Conf. on System Sciences (Cat. No. 97TB100234), Part vol. 1, pp. 379-388, IEEE, Rowstron A.I.T. and Wood A.M.
"Generative Communication—The Tuple Space" at HTTP://www.cdc.informatik.th-darmstadt.de/home/LiPS/LiPS/documentation/objects/doc/html/papers/RTSPP/RunTimeSystem/node2.html#SECTION00021000000000000000000.
Grantham K.H. Pang, "Elevator Scheduling System Using Blackboard Architecture", IEEE PROCEEDINGS-D, vol. 138, No. 4, Jul. 1991, pp. 337-346.
Daniel Corkill, "Blackboard Systems", AI Expert, Sep. 1991, pp. 41-47.
Shawn D. Bird, "Toward a Taxonomy of Multi-Agent Systems", Int. J. Man-Machine Studies (1993) 39, pp. 689-704.
Pan et al., "An Intelligent Agent Framework for Enterprise Integration", IEEE Transactions on Systems, Man. and Cybernetics, vol. 21, No. 6, Nov./Dec. 1991, pp. 1391-1408.
H. Penny Nii, "Blackboard Systems: The Blackboard Model of Problem Solving and the Evolution of Blackboard Architectures", The AI Magazine. Summer 1986. pp. 38-53.
Grace Yuh-Jiun Lin et al., "Integrated Shop Floor Control Using Autonomous Agents", Jul. 1992, IIE Transactions, vol. 24, No. 3, pp. 57-71.

* cited by examiner

*Primary Examiner*—Saleh Najjar
*Assistant Examiner*—Benjamin R. Bruckart
(74) *Attorney, Agent, or Firm*—F. Chau & Associates, LLC

(57) ABSTRACT

A system for controlling and coordinating activities among entities in an information and process environment comprising a communications pathway for transmitting and receiving communications of the entities, and a shared memory connected to the communications pathway for maintaining a tuple space on which the entities post and receive messages synchronized to discrete time intervals.

23 Claims, 17 Drawing Sheets

PROCESSING BY USE OF SYNCHRONIZED TUPLE SPACES AND ASSERTIONS

FIELD OF THE INVENTION

This invention relates in general to the field of distributed information processing, resource allocation, computing and communications and more specifically to a system and method of organizing tuple spaces by synchronization to coordinate activities among multiple entities.

BACKGROUND OF THE INVENTION

Distributed information processing involves two or more processing entities under autonomous control or purpose which operate cooperatively to resolve a processing need. Such entities frequently operate within a system and are frequently subsets of larger systems tailored to address a specific processing aspect, but may originate remotely making demands on the local system. In complex systems, entities frequently compete and share resources within the environment and the operation of one entity may affect, degrade, inhibit, or even destabilize the operation of another. One of the problems in distributed information processing and computing is the coordination of activities among the various entities in the environment. While the coordination problem manifests itself in distributed environments, it also appears in other contexts such as integrated multi-component computing systems where coordination is required between multiple components which may reside within the same cabinet or in service environments where resources must be shared.

One example of this problem is the creation of features in telephone switching systems. Telephone switching systems are typically very large. They are implemented to provide many hundreds of features and consist of tens of millions of lines of code. These systems are not static. The developers of such systems are required by competitive pressures to add features on a regular basis. This presents the problem that the additional functions of new features interact with the functioning of features already present in the system. In the worst case, the newly added features can disable the functioning of an older feature, destabilize the system or create conditions which will confuse the user. Because of this problem, previous approaches have expended considerable effort during the development of new features to determine all possible interactions with all of the other features in the system. There have been many proposals to handle the problem of feature interaction in telephone systems. In one prior art system, Northern Telecom has developed a method in which models of call set up have been developed for the Intelligent Network and the Advanced Intelligent Network where features are constructed as separate state machines which interact by communication through a stack based mechanism to provide a degree of regularity in call processing.

A second example of the problem is the coordination and allocation of resources in the provisioning of a service, especially in real time environments where there are time and qualitative constraints. Where there are numerous applications that use a service, such as a printing service, and a number of print processes that serve requests, difficulty occurs in allocating resources to get the job done given the various priorities and quality requirements of each job and the current status and capability of each resource.

A third example of the problem is component coordination in multiple component systems. Component based hardware and software uses parts developed by different vendors. Vendors create components from parts developed by other vendors. When components are brought together, in some circumstances, they modify the behavior of other components. If the parts are static, with their behavior well known and not expected to change over the course of a component's lifetime, then it is possible to identify and resolve all possible component interactions at the time of the original system design. However, in this prior art approach, it is necessary to consider the behavior of any part in the presence of all the possible combinations of all other parts. When the number of parts becomes large, the task becomes enormous, and virtually impossible when components are not available and their behavior not known beforehand at design time, or the behavior can be changed or upgraded after the initial implementation.

The use of tuple spaces is also known in the art as a means of communication between entities. A tuple space is an instance of a blackboard architecture where there are knowledge sources or entities that invoke operations on the blackboard. In the prior art, knowledge sources communicate with the tuple space using a publish-subscribe mechanism. An entity in a prior art tuple space will publish the occurrence of its action or event such that other entities who subscribe become aware that the event has occurred. These prior art tuple spaces are event based and asynchronous. This means that the tuple space provides matching and processing of tuples on the occurrence of events. However, there are problems with prior art tuple spaces. The event based, asynchronous nature of prior art tuple spaces leads to complications in synchronization, maintaining of data integrity and potential dead-locks. There are no assurances that events will occur or means to communicate that the occurrence of an event is no longer relevant.

SUMMARY OF THE INVENTION

The present invention is designed to provide a system and method for coordinating activities of multiple entities in an information processing or computing environment where entity interaction and conflict can be detected and resolved during operation. It provides a mechanism by which entities can coordinate their activity through assertions in a special inventive tuple space. With the inventive system and method, entities need only be aware of the objective of other entities and not their respective detailed implementations. An entity can represent a hardware or software component or process, a knowledge source or feature thereof.

This invention is based on the coordination of entities by assertions in a shared synchronized tuple space to with which an entity communicates and has access. Entities operate in a permission-action loop. This is in contrast to the publish-subscribe nature of prior art tuple spaces. An entity in an information environment that is in charge of an activity will decide to perform an action in furtherance of the activity. This entity will form an "intention" to perform this action. The 'intention' contains the semantic value of the action with regard to the activity. Before proceeding with the action, the entity will place this intention as an assertion within a tuple space. Other entities which have an interest in this sort of intention about the activity can monitor the tuple space so that they will be informed of such intentions. They can then respond to the original entity with their comments about the intention. In effect, with knowledge about the state of the activity, the other entities act as advisors to the original entity. Thus, the original entity forms an intention about how to proceed with the activity and asks permission of other entities (the lack of which can be overridden) before it proceeds. In this manner, new entities, features, knowledge sources, processes or components can interact with previous ones before activities dangerous to the operation of the system are undertaken in a manner to ensure that system degradation or failure does not occur. The present invention is particularly useful for application to the call processing environment, although it is obvious to one skilled in art that the invention is not limited to that application.

Therefore, according to one aspect of the present invention there is provided: a system for controlling and coordinating activities among entities in an information and process environment comprising: a) a communications pathway for transmitting and receiving communications of the entities; and a shared memory connected to the communications pathway for maintaining a tuple space on which the entities post and receive messages synchronized to discrete time intervals.

According to a further aspect of the present invention there is provided: a method for controlling and coordinating activities among entities in an information and process environment comprising the steps of: a) providing a communications pathway for transmitting and receiving communications of the entities; b) providing a tuple space in a shared memory adapted for operation in discrete time intervals connected to the communications pathway; and c) posting and receiving messages of the entities to and from said tuple space synchronized to the discrete time intervals.

According to another aspect of the present invention there is provided: a method of call processing comprising the steps of: a) providing entities representative of call processing features; b) providing a communications pathway for transmitting and receiving communications of the entities; c) providing a tuple space in a shared memory adapted for operation in discrete time intervals connected to the communications pathway; d) requesting advice by a first of the entities desirous of taking action of other entities before taking the action by posting messages communicated on the tuple space to the other entities through the pathway; e) providing advice as desired by the other entities responsive to the messages by posting responding messages communicated on the tuple space to the first of the entities; f) evaluating the responding messages, if any, by the first of the entities; and g) taking advised action by the first of the entities after evaluating the responding messages.

According to another aspect of the present invention there is provided: a method for providing services in an automated contract environment comprising the steps of: a) providing a communications pathway for transmitting and receiving communications of application entities and service entities; b) providing a tuple space in a shared memory adapted for operation in discrete time intervals connected to the communications pathway; and c) posting and receiving messages of the application entities and the service entities to and from the tuple space synchronized to the discrete time intervals.

DETAILED DESCRIPTION OF THE PREFERRED EMBODIMENT

Figure 1:
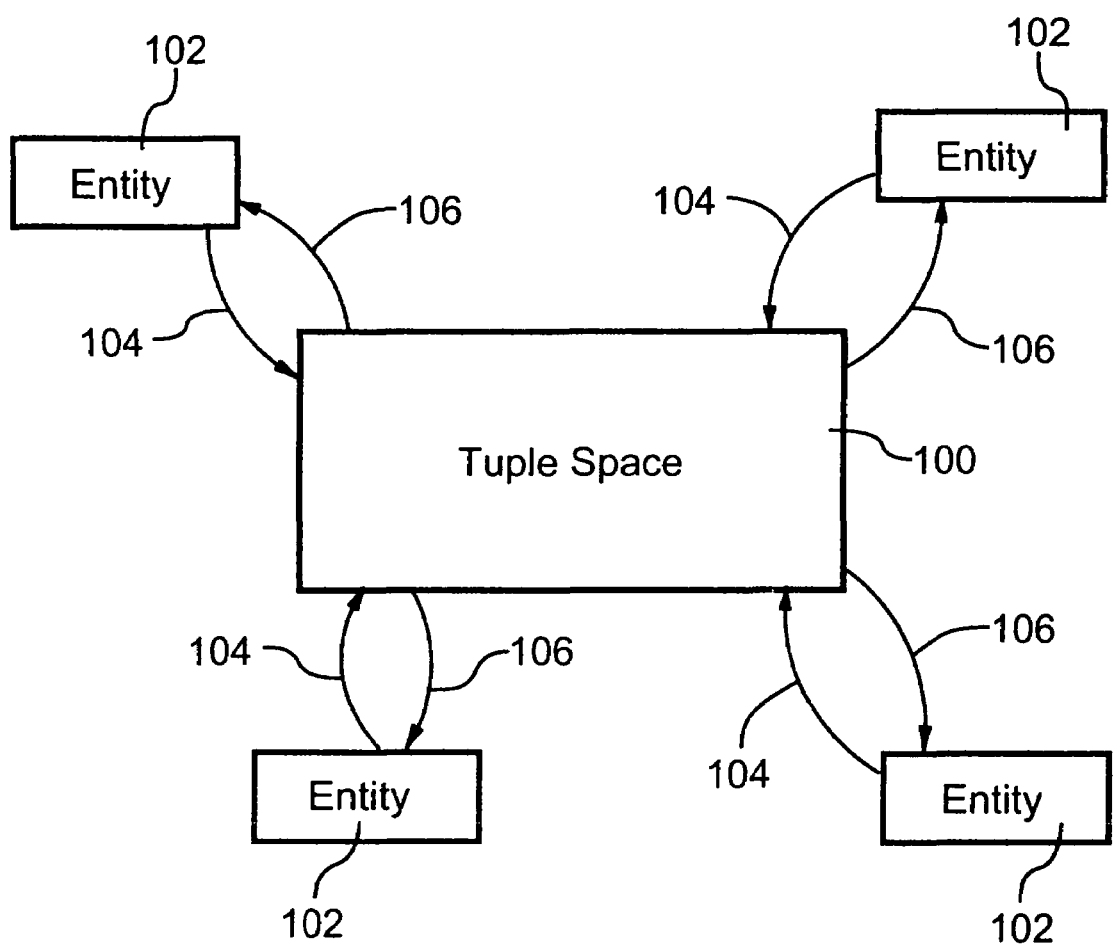
FIG. 1 is a representative diagram of the synchronized tuple space of the present invention.

Turning to FIG. 1, a tuple space 100 of the present invention is shown. The tuple space 100 illustrates an inventive modified implementation of a blackboard architecture. Traditional blackboard architectures are well known in the art. Blackboard architectures and systems have been described in the publications "Blackboard Systems", by Daniel Corkill, published in AI Expert, September 1991, pp 41–47, "Blackboard Systems: The Blackboard Model of Problem Solving and the Evolution of Blackboard Architectures" by H. Penny Nii, Published in The AI Magazine, Summer 1986, pp. 38–53, and "Elevator Scheduling System Using Blackboard Architecture", by Grantham K. H. Pang, published in IEEE Proceedings-D, Vol. 138, No. 4, July 1991, pp- 337–346.

One feature of the present invention is that the tuple space 100 has been inventively modified to be synchronized which allows for the timely and orderly processing of tuples. The tuple space 100 is synchronized with a clock that defines time slices as reference points for operation on the tuple space 100. Tuple-space operations on the inventive tuple space 100 use an additional parameter, that is, number of time slices that the operation pertaining to the tuple remains in effect (time-slice counter). The synchronized tuple space 100 of the present invention provides a regular structure which can be used to help remove the complexity of interaction among multiple entities such as entities 102. Entities 102 have a communications link and shared access to tuple space 100. With the inventive system and method, entities 102 need only be aware of the objective of other entities and not their respective detailed implementations. In this manner, entities 102 can communicate through the tuple space 100 even if they do not know of each other beforehand. This facilitates a method of system operation through the use of tuple space 100 whereby loosely coupled entities 102 can operate cooperatively and new system features and components can interact and be added in an evolutionary manner. Entity 102 is communications enabled and may be a physical device, functional element, a hardware or software component or process, a program or application, component, knowledge source or feature, or a higher level abstraction thereof embodied in physical devices or applications operating in an intelligent manner. Entities might be represented or embodied as agents.

In the architecture employing tuple space 100, one or more entities 102 communicate through and invoke operations in the tuple space 100.

In prior art systems, only an anti-tuple is used to assess the current contents of a tuple space. In contrast, in the present invention, the assertion tuple is placed in the system in addition to anti-tuples to collect the responses. The asserting entity will wait a period of time set as a number of time slices of the tuple space for collecting the tuples sent in reply by any and all entities that desire to reply. At the end of that time period, the collecting tuples are removed and all reply tuples received after that period will be ignored and discarded. This mechanism resolves a prior art problem of requiring an entity to explicitly retract an unanswered tuple. The waiting period synchronizes the collection of reply tuples and provides a discrete amount of time for responses creating the synchronization of the tuple space 100. The time period used for synchronization is adjustable and can be set as the same period for all assertions and contemporaneous for all assertions. This facilitates one implementation of the tuple space 100 in hardware memory application under processor control or in an ASIC. However, the invention is not limited in this manner and nothing precludes an asserting tuple from using any time period which is deemed suitable according to the required circumstances.

Tuple space 100 has shared data storage that facilitates content based addressing of its content accessible to the entities. Tuple space 100 may be implemented in memory running as a process or application on a processor, or on an ASIC, EPROM in any such other equivalent form as obvious to one skilled in the art. Processes and applications described herein are comprised of software written in any compatible language executed on a processor such as is well known in the art, which includes any required program and data storage apparatus, such as random access or disk memories. Applications or processes may be stored as software in memory operating under control of a processor. The invention is not limited to any particular physical device and it is obvious to one skilled in the art that the present invention can be adapted for embodiment in personal computers, servers, printers, telephones, switches, networks, data storage equipment, data transmission equipment or virtually any electronic or intelligent or intelligently controlled equipment.

Each entity 102 has a communications path 104 which may be a network, or a bus architecture for placing tuples on tuple space 100 and a similar communications path 106 for retracting tuples from tuple space 100. Entities 102 interact with tuple space 100 using a permission/action mechanism. The permission/action loop mechanism exemplifies why this is a synchronized tuple space. All entities 102 must obey a convention for interaction that is carried out by the synchronized tuple space 100. The convention is: "an entity that intends to perform an action that involves a significant change in the environment solicits advice for permission for the action during a specified number of time slices before the entity can proceed with the action" This convention breaks with the traditional view on encapsulation in software. The traditional view requires all the decision making to be encapsulated within the part itself. It should be noted that entities 102 are merely seeking advice for permission, which can be overridden in special or exceptional circumstances. But generally, entities 102 should comply with the convention.

Using communication paths 104 and 106, entities 102 post and communicate messages in the form of asserting and removing tuples and anti-tuples containing ingles from tuple space 100. The functions of entities 102 and tuple space 100 may be performed, coordinated or facilitated by agents. Tuple space 100 is configured with pre-defined sets of tuple formats specific to the purpose of the tuple space 100 as well as operations or commands to be performed on tuples. Likewise, each entity 102, when initialized, is informed of the pre-defined sets of commands and the pre-defined tuple formats for interaction with the tuple space 100. The pre-defined sets of tuple formats and the operations or commands form an ontology for communications on the tuple space 100. The ontology is followed by all entities interacting with the tuple space 100. The ontology is specific to the circumstances and to the particular tuple space 100 and provides the common means of communicating for entities 100. The ontology, which may be viewed as a business rule engine, provides system designers and software engineers a method of resolving the distributed information processing and multi-component computing coordination and feature interaction problem as illustrated in further detail below.

Tuples, placed in the tuple space 100 are type-value pairs called ingles. Each ingle consist of a type (say Name) and a value (say John Doe). The following is an example of a tuple in a pre-defined format which would describe an employee for a company.

{name John Doe:age 37:employee_number 12345:start_date 810126:position T12}

The tuple space 100 enables coordination among entities by allowing queries based on the matching of tuples by anti-tuples. An anti tuple is a tuple in which can be used as a query in the tuple space 100. In form, it is identical to a tuple except that the value of any or all fields may be replaced by a "?" which indicates a "don't care" condition. Tuple space 100 matches and returns all tuples with anti-tuples which agree in all fields except for that one indicated by the ? query. Thus the anti tuple:

{:name?:age 37:employee_number?:start_date?:position T12} would return the tuples for all employees of position T12 who are 37 years old. In a preferred embodiment, this is set up as a function or procedure call through a suitably defined interface for the request and return of tuples.

As mentioned above, the tuple space 100 has pre-defined operations or commands that change state of the tuple space. For example, typical operations or commands are defined as:

a) out—This command "asserts" or places a tuple on the tuple space 100. The duration for the tuple set as a number of time slices of the tuple space may be specified for how long this tuple should remain in the tuple space. This may be any period up to indefinite.

b) in—This command queries with an anti-tuple and retracts a tuple from the tuple space 100. In this case, a tuple which matches the parameters of the "in" command identifies the tuple to be retracted. This command is typically used in association with the "out" command by the same calling entity, although this is not required. If there is no matching tuple present on the tuple space 100, then the operation of the calling entity blocks on the process that performs the "out" operations. The process of the calling entity is resumed once a matching tuple has arrived on the tuple space 100. The retracted tuple is then returned to the procedure or entity that invoked the operation, or is discarded. A duration set as a number of time slices may be specified to last for any period up to indefinite. Copies of matching tuples will be returned through the interface to the calling entity and the tuples will be removed from the tuple space 100.

c) rd (read)—This command reads the tuple space 100 with an anti-tuple. It does the same as "in" operation but does not retract the tuple. A duration set as a number of time slices may be specified to last for any period up to indefinite. Copies of matching tuples will be returned through the interface and the tuples will remain in the tuple space 100.

d) Cancel—This operation can be introduced to cancel pending "rd" and "in" requests. It does not require the time-slice counter. Tuple-space matches cancel operations to all pending "in" and "rd" requests. Matched requests are terminated.

The "rd" or "in" operations or commands block their own operation until a tuple that matches the request arrives on the tuple space 100. However, the work of the tuple space 100 carries on. After a matching tuple is recovered, the entity unblocks its activity and processes the tuple.

Tuple space 100 provides the matching synchronously with a clock that defines time slices for the frequency of matching. All "rd" and "in" requests are matched to the current content of the tuple space at the time when tuple space 100 receives notification of the end of the time slice. At that time following happens:

all "cancel" operations are performed;
all pending "rd" and "in" are evaluated. All matches accumulated during last time slice are dispatched to originators of "rd" and "in" requests.
all tuples matching pending "in" requests are garbage-collected;
time-slice counter for all "rd", "in" and "out" operations decrements;
all elapsed "rd" and "in" requests are garbage-collected;
all elapsed tuples are garbage-collected.

Each entity is aware of the duration of one time slice of the tuple-space 100 and coordinates its operation as multiples of time-slice duration. The time slices facilitate synchronization and create rates at which entities supply and retract information from the shared tuple-space 100. Time slices may be of any duration, but are typically a function of the characteristics of the hardware and the nature of the communications system and environment.

It is possible for more than one entity to process the same tuple. When multiple entities process a tuple, it is important that the tuple that triggered unblocking was retracted by exactly one of the entities. This creates complex situations which can be resolved by the creation of entities or a procedure to keep track of tuples to ensure during operation that there will be one entity that retracts the tuple. Each entity can reside on the same or a remote host or processing device. In a case of remote source, network protocols are used for information exchange and synchronization.

A further aspect of the present invention is illustrated with respect to its application to the call processing environment to solve the feature interaction in call processing and maintenance. The present invention solves the problem of creation of multiple features which may interact with each other. The present invention provides a system and method for the operation of features and the addition of new features to an existing system to provide a viable way to determine if the new feature will undermine the goals of an existing feature. The features are represented by entities. An entity for the feature attempting to do something with a call will place an assertion in the form of a tuple in the tuple space. Examples of such feature assertion entities could be: originating call, terminating call, alerting user, receiving message, sending message, altering data (i.e. proclaiming night service), etc.

These entities assert, using the commands and tuples previously described, requests in the tuple space for permission to proceed with the action. Other features whose entities have registered interest in such occurrences with the call can comment on the proposed action using the commands and tuples previously described. In this, they act as advisors. The originating entity of the assertion can take their interventions and with its own internal logic can decide what would be the best course of action to take.

In this manner, new features can be added, or features upgraded or changed at run time in a call processing system by assertions and responses communicated through the tuple space. Thus, existing features represented by entities, do not need to be directly aware of other or new features beforehand. This provides a flexible way for new features to be added, or existing features customized to the particular requirements.

Coordination of call processing applications with tuple spaces is accomplished by use of the permission/action loop mechanism among features implemented as entities. Each feature entity, when initialized, is informed of the pre-defined sets of command and tuple formats for interacting with the tuple space. For example, a simple call processing service may consist of entities that handle the features of: Originate Call, Originate Call Screening, Terminate Call, and Termination Call Screening. Other features can be implemented in a similar manner to those described herein.

In this example, calls would be originated by the Originate Call feature. When a person or entity, (which may be represented by a agent) decides that it wants to place a call, it places a tuple in the pre-defined form necessary to interact with that tuple space. An example for originating a call is the placement of the tuple into the tuple space to placing a call to 592-2122 such as:

{call_sequence_# 5678:type originate_request:termination_end_point 592-2122}

In the above tuple, the entity is asking if any other feature or entity would like to intervene in the creation of this call. Originate Call feature would have placed a compatible anti-tuple in the tuple space and would therefore receive all comments on its intended actions. It would assess these comments in the mode of the permission/action model and then decide whether to proceed or not.

Origination Call Screening is feature intended to monitor outgoing calls to prevent calls to specified numbers. The entity for the feature would be place an anti-tuple of the form:

{:call_sequence_# ?:type originate_request:termination_end_point ?} in the tuple space in order to be informed of any outgoing call attempt. The entity for the feature would receive the tuple and match the value of the:termination endpoint ingle with the members of its denial list. If the endpoint is denied, it can place a tuple of the form:

{:call_sequence_# 5678:type originate_request:status prohibit} in the tuple space to indicate its objection.

FIGS. 2 to 8 provide an example of the implementation of the synchronized tuple space of the present invention in a subset of a PBX system used to resolve the feature interaction problem. PBX sub-set 200 illustrates a portion of a PBX system having hundreds of features for illustration purposes only. The invention can be adapted to all of the features. The PBX system of which PBX subset 200 is a part, may be any commercially available PBX such as is well known in the art such as the SX-2000 available from Mitel Corporation. While the invention is described with respect to a PBX system and the subset of such system, the invention is not restricted to such systems or parts of such systems. It is obvious to one skilled in the art that the invention may be adapted to other computing systems, environments and applications. Entities in FIGS. 2 to 8 are implemented as agents. While agents are used for the purposes of the illustration in FIGS. 2 to 8, it can be appreciated by a person skilled in the art that the invention may be adapted or implemented without the use of agents using other obvious alternate embodiments without deviating from the sphere and scope of the invention. Software agents, may be implemented as software processes written in any appropriate computer language running on a processing device. A general system using agents has been described in the publications "Toward A Taxonomy of Multi-Agent Systems", Int. J. Man-Machine Studies (1993), 39, 689–704, Academic Y. C. Pan and Jay M. Tenenbaum, Transactions on Systems, Man and Cybernetics, (Vol. 21, No. 6, November/December, 1991, pages 1391–1407. An example of a communication system using agents has also been described in U.S. Pat. No. 5,638,494. Each of the software agents could be implemented using Object Linking and Embedding (OLE) Component Object Model (COM) objects. Both OLE and COM were developed by Microsoft®.

PBX sub-set 200 illustrates three user accounts that have the following features. User account 1 has the feature call forwarding. User account 2 has the features call screening and call forwarding to account 3 when account 2 is busy.

Tuple space content 204 of synchronous tuple space 201 is shown at consecutive time slices 202 for seven consecutive time slices numbered 1 to 7 illustrated in FIGS. 2 to 8 respectively. Read requests 206, in requests 208 and cancel requests 210 received from any of entities 212, 214, 216, and 218 are also shown at each of the seven consecutive time slices 202.

Figure 2A:
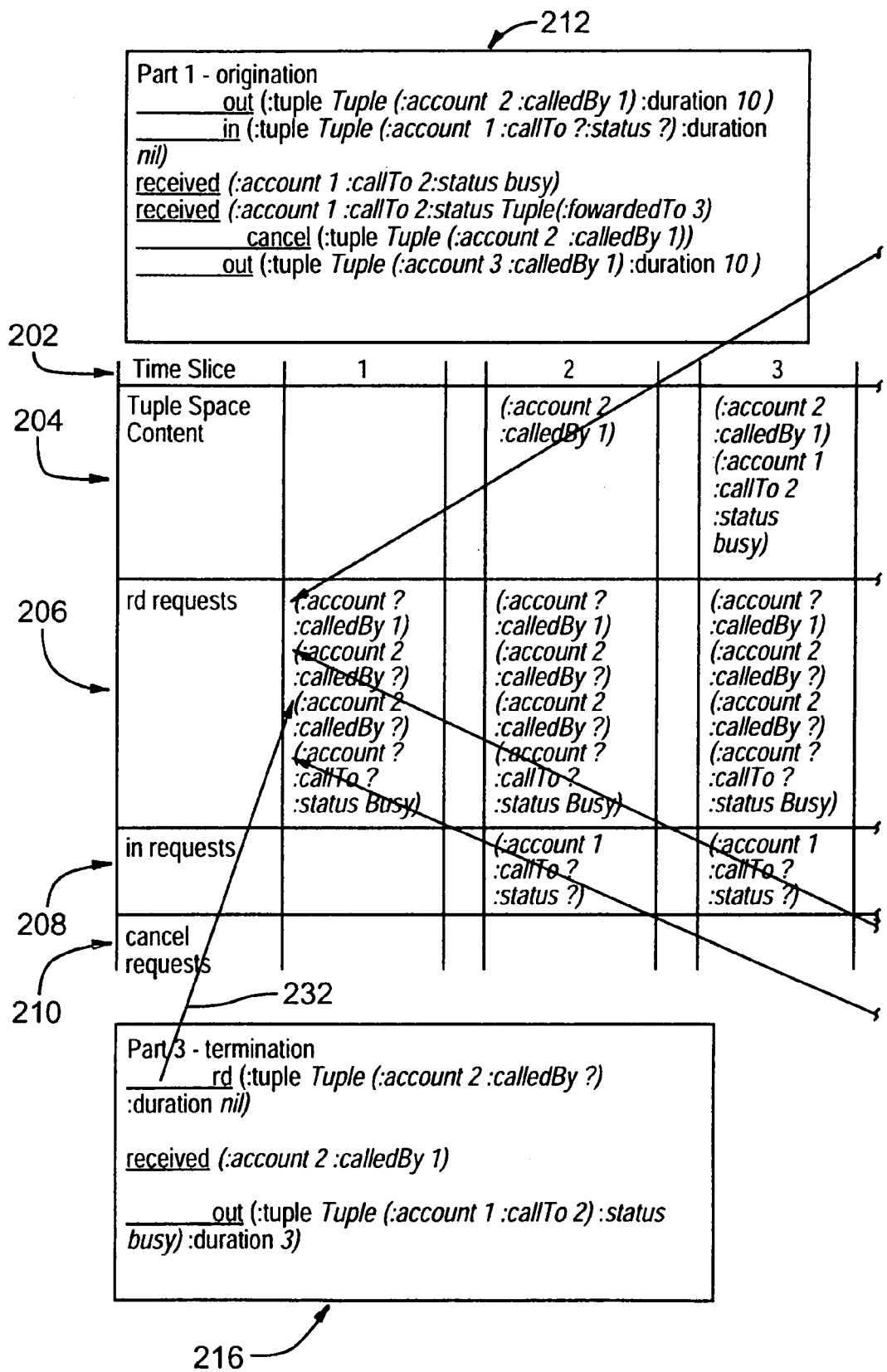
FIG. 2 is a representative schematic drawing illustrating the operation of the synchronized tuple space of the present invention through a first time slice in a call processing environment.
Figure 2B:
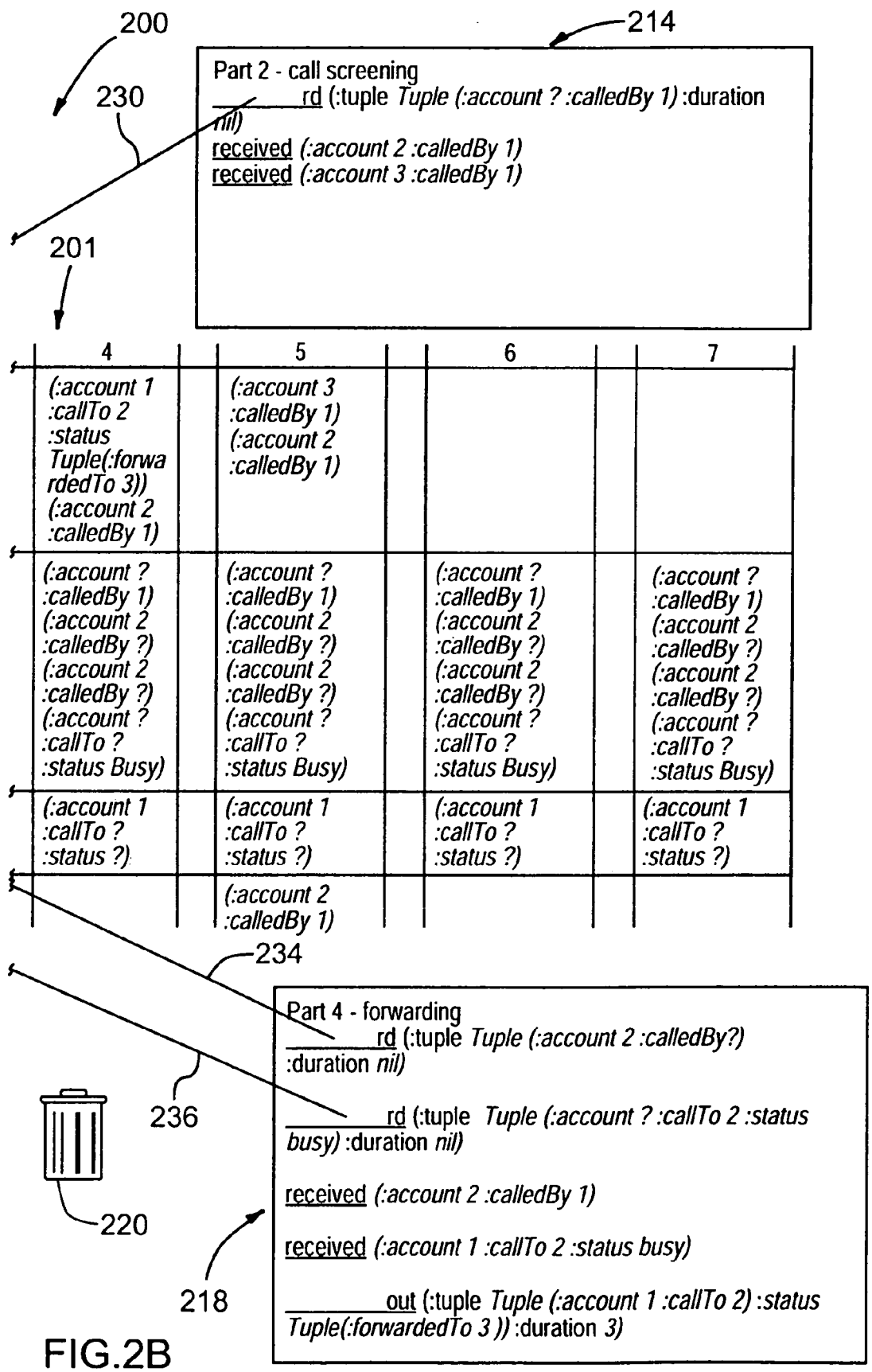

The interaction described above is managed as follows: origination entity 212 manages origination of a call on account 1; call screening entity 204 manages originating call screening on account 1; termination entity 216 manages termination of a call on account 2; and forwarding entity 218 manages call forwarding on account 2. Turning to FIG. 2, the activities occurring during the first time slice 202 are illustrated. At the start of the first time slice, at operation 230, call screening entity 214 subscribes to obtain notice of any calls placed by account 1. At operation 232, termination entity 216 subscribes to obtain notice of any calls made to account 2. At operation 234, forwarding entity 218 subscribes to notice of any calls made to account 2. At operation 236, call forwarding entity 218 subscribes to any calls made to account 2 where the status is busy.

Figure 3A:
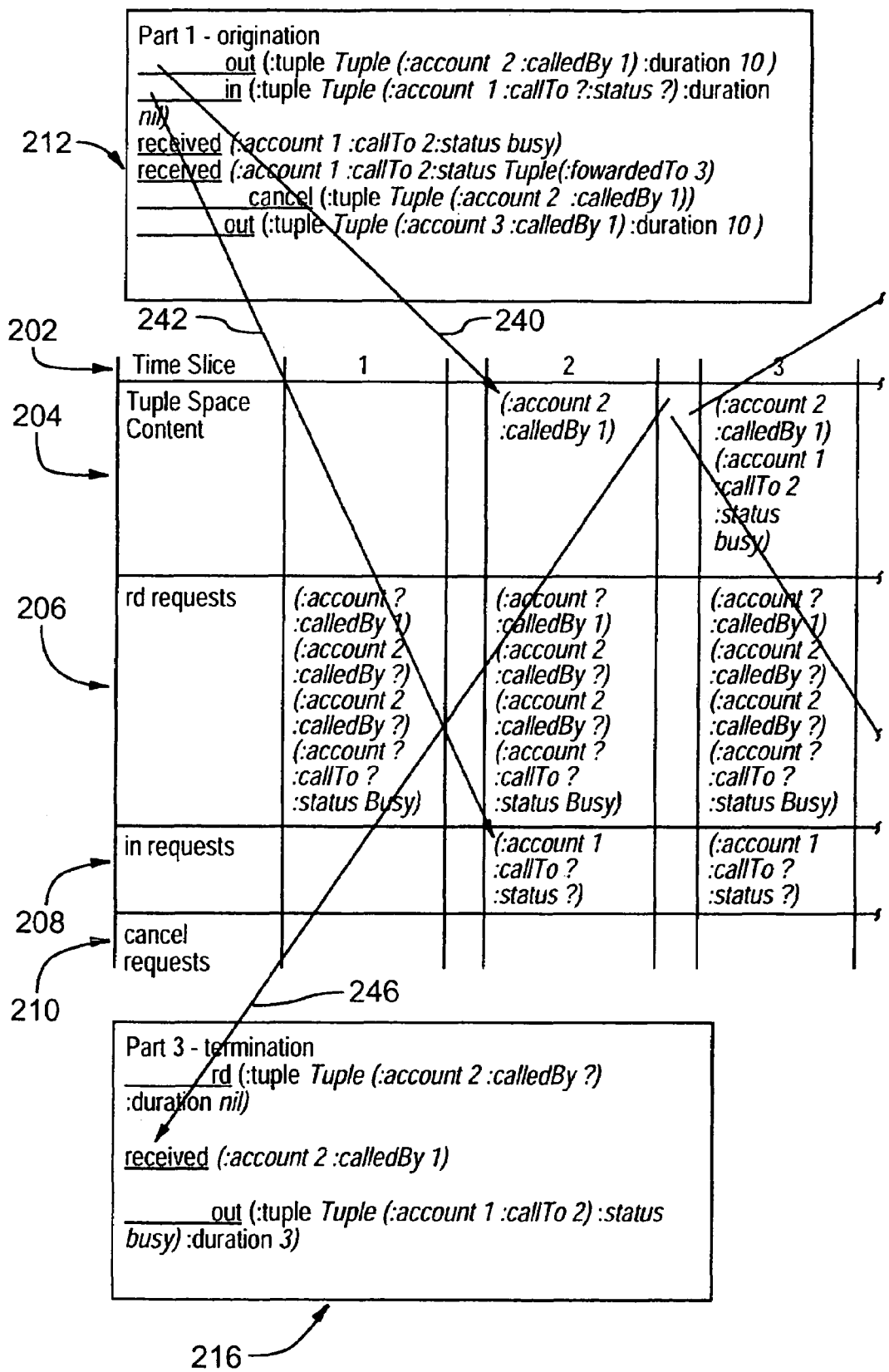
FIG. 3 is a representative schematic drawing illustrating the operation of the synchronized tuple space of the present invention through a second time slice in a call processing environment.
Figure 3B:
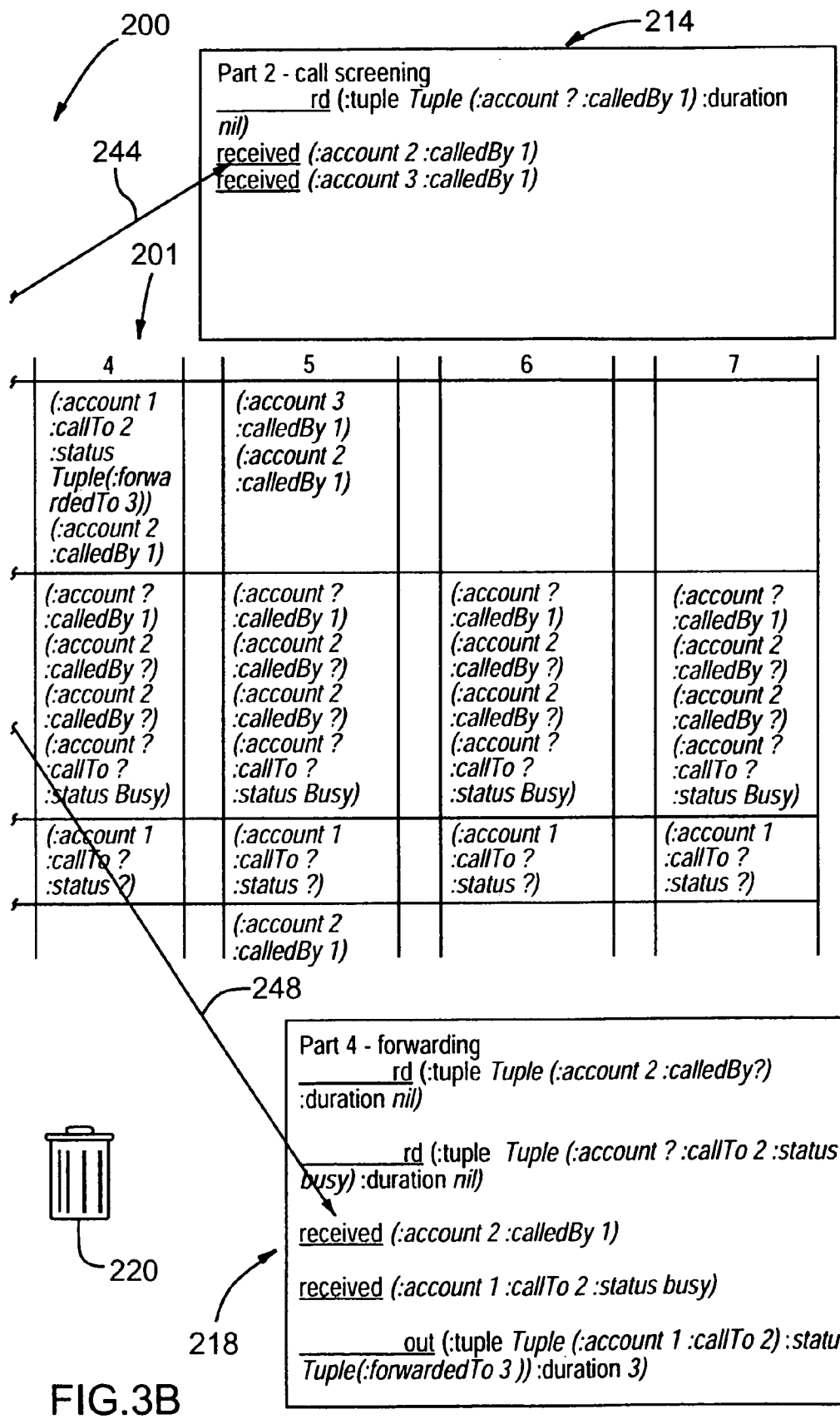

Turning to FIG. 3, the activities occurring during time slice 2 are illustrated. At the start of time slice 2, at operation 240, origination entity 212 originates a call by account 1 to account 2. At the same time, by operation 242, origination entity 212 subscribes to being given notice of any comments or objections raised by any other entity of the call placed by account 1 to account 2. At the end of time slice 2, at operation 244, call screen entity 214 receives notice of the call to account 2 by account 1 because of the previous read request placed by entity 214 in synchronous tuple space 201. At operation 246, termination entity 216 receives notice of the call to account 2 by account 1 because of the previous read request placed by entity 216 in synchronous tuple space 201. At operation 248, forwarding entity 218 receives notice of the call place to account 2 by account 1 because of the previous read request on synchronous tuple space 201 by forwarding entity 218.

Figure 4A:
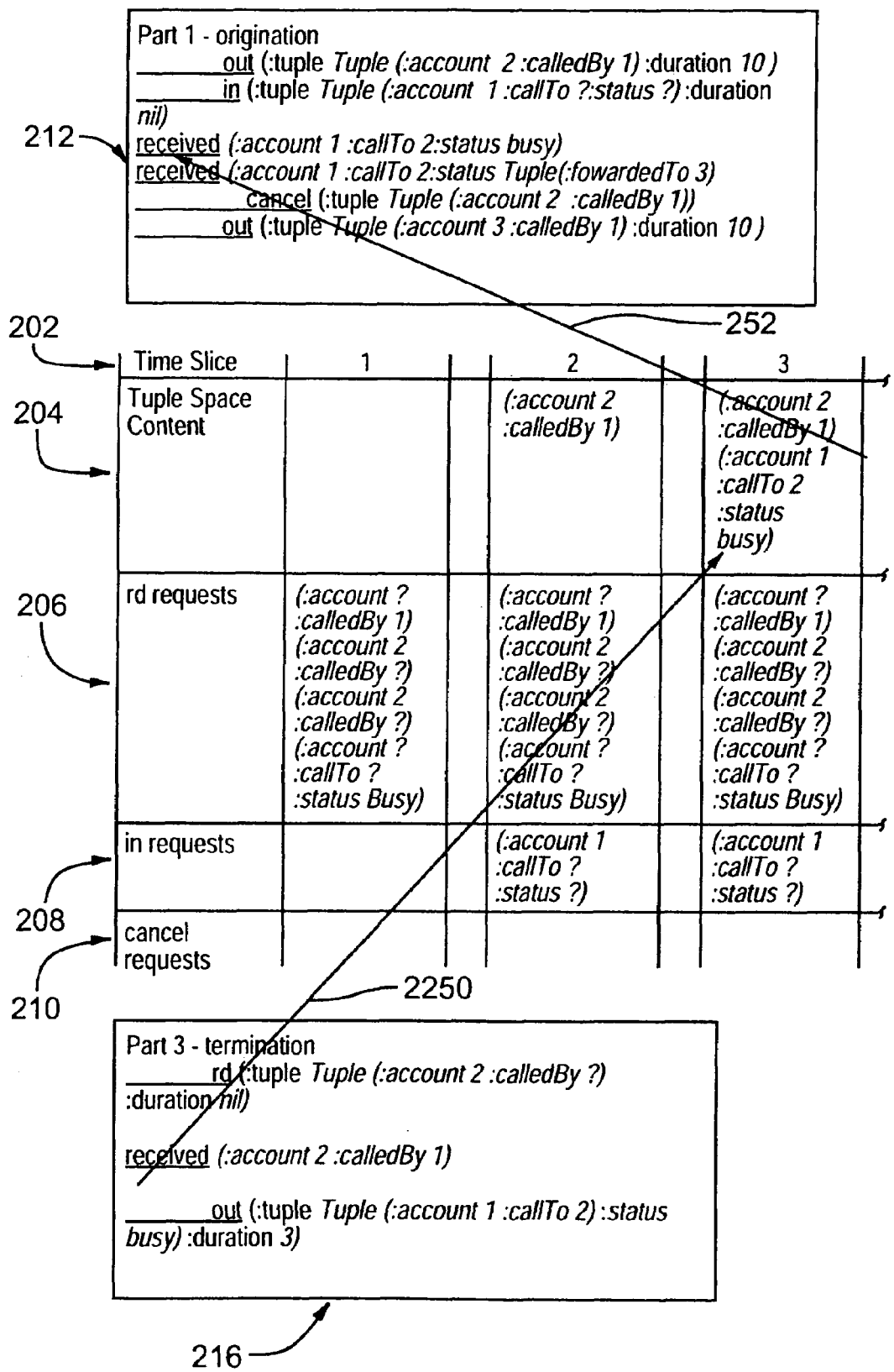
FIG. 4 is a representative schematic drawing illustrating the operation of the synchronized tuple space of the present invention through a third time slice in a call processing environment.
Figure 4B:
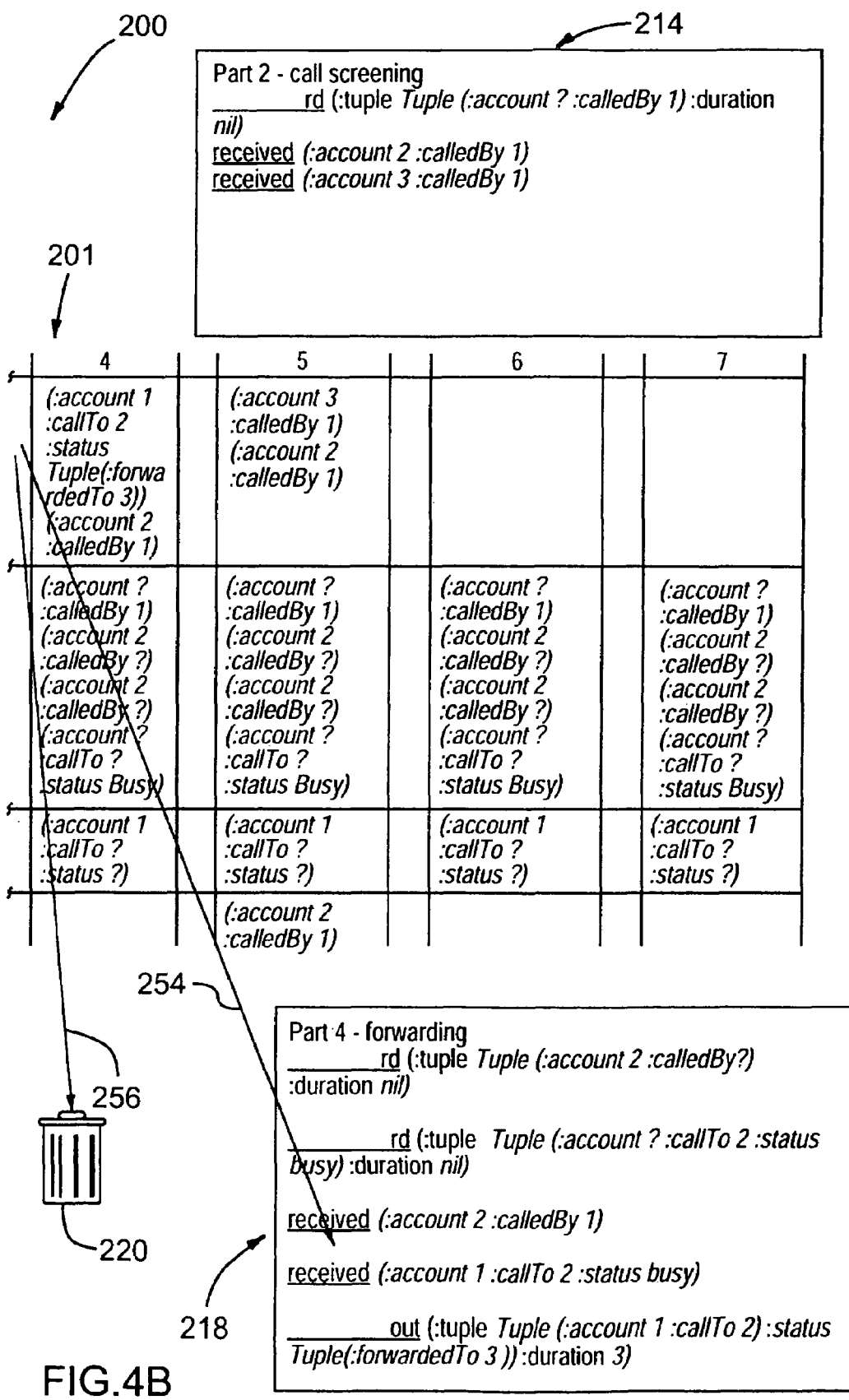

Turning to FIG. 4, at the start of time slice 3, at operation 250, in response to the notice received of the call to account 2 by account 1, termination entity 216 issues an out command notifying all entities of synchronous tuple space 201 that the call by account 1 to account 2 is busy. At the end of time slice 3, at operation 252, origination entity 212, because of the previously issued in command, receives notice that the call from account 1 to account 2 is busy. At operation 254, forwarding entity 218, because of the previously issued read command, receives notice that the call from account 1 to account 2 is busy. At operation 256, the tuple in tuple space 204 by operation 250 is discarded in trash 220 by the in request 208 content.

Figure 5A:
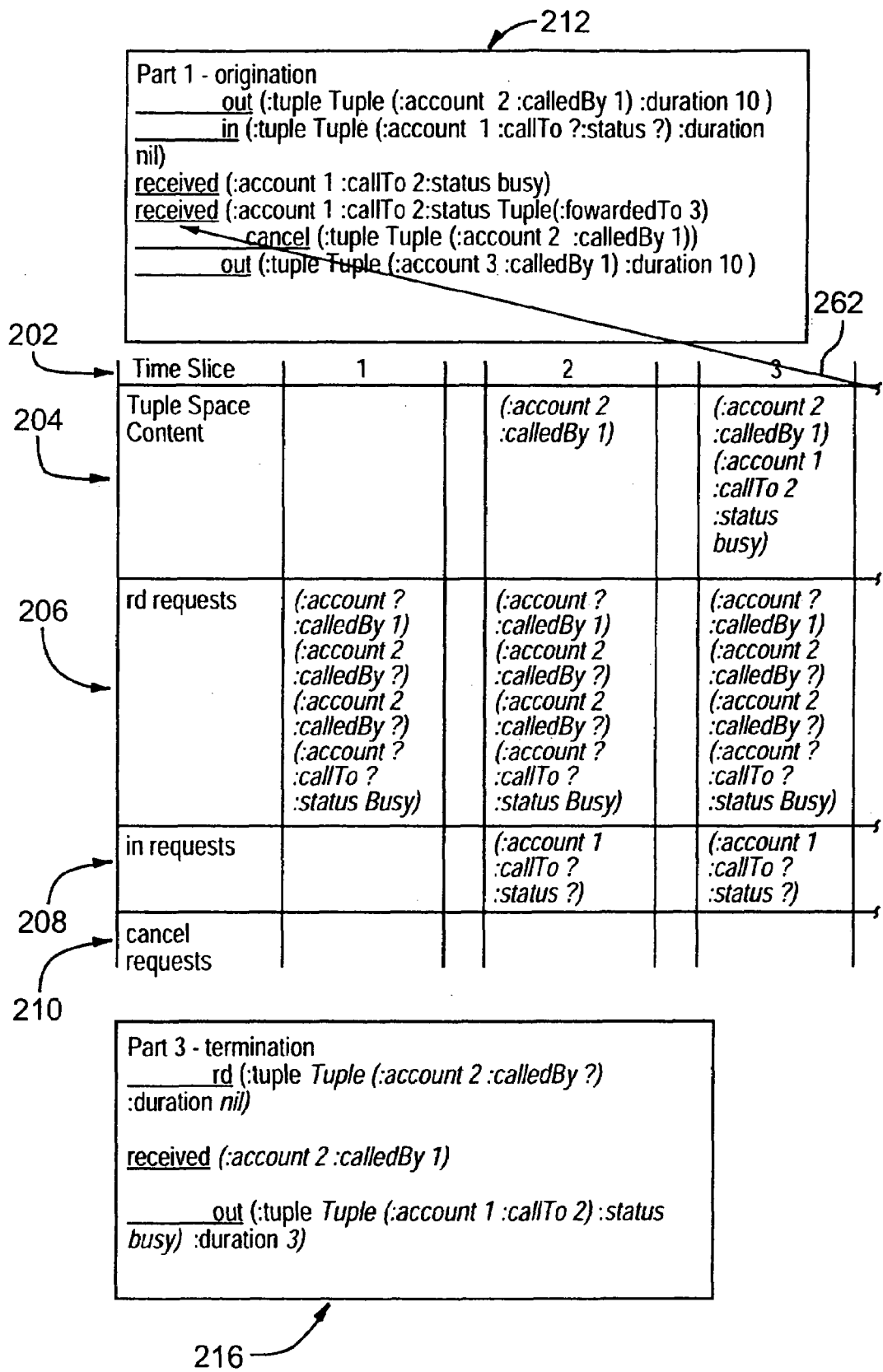
FIG. 5 is a representative schematic drawing illustrating the operation of the synchronized tuple space of the present invention through a fourth time slice in a call processing environment.
Figure 5B:
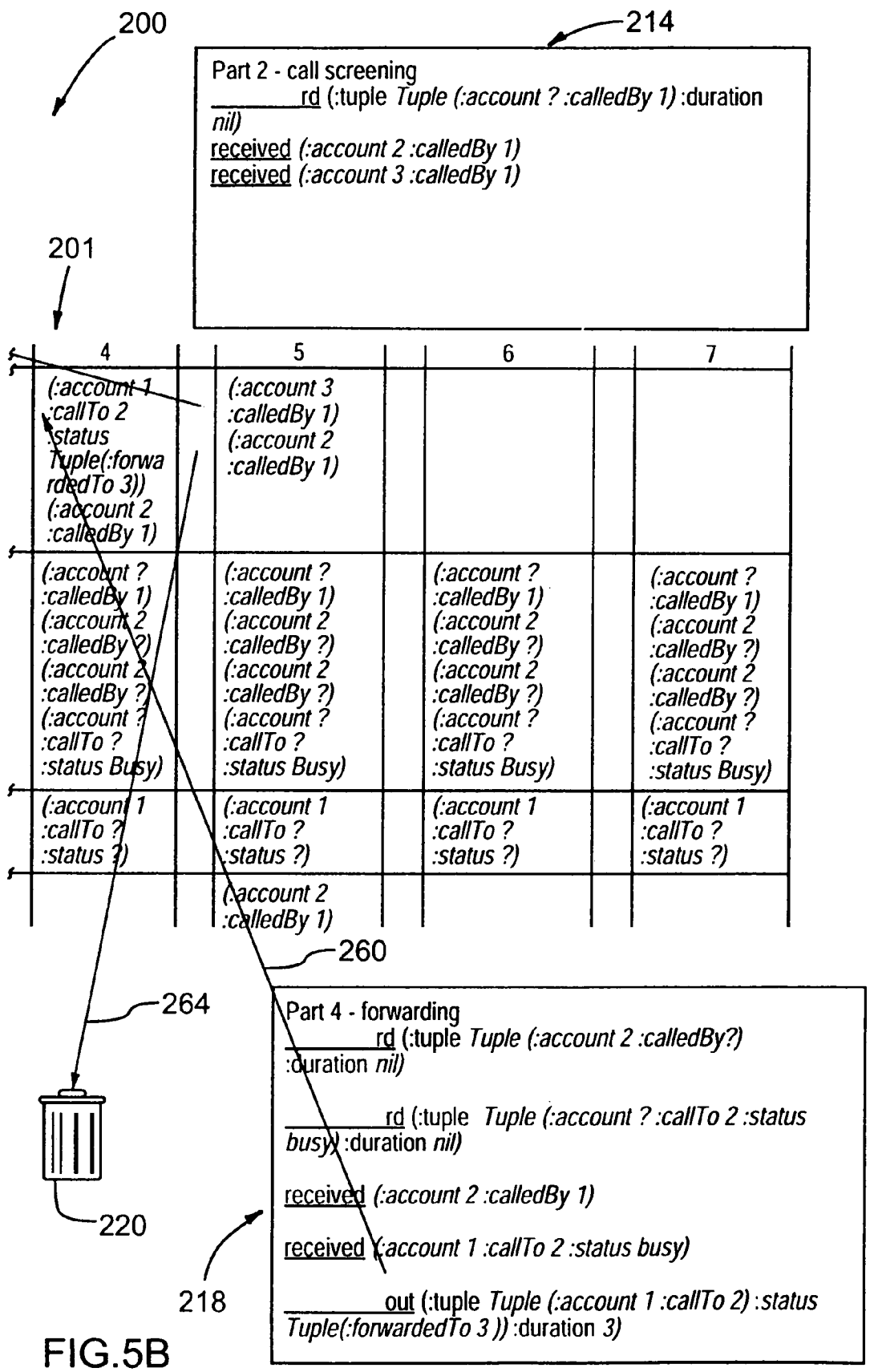

Turning to FIG. 5, at the start of time slice 4, at operation 260, in response to the notice that the call to account 2 from account 1 is busy, forwarding entity 218, using the "out" command, places a tuple into tuple space content 204, indicating that the call to account 2 from account 1 is forwarded to account 3. At the end of time slice 4, at operation 262, origination entity 212 receives notice that the call from account 2 to account 1 has been forwarded to account 3. At operation 264, the tuple placed in tuple space 204 by operation 260 is discarded to the trash 220 by the "in" request 208 content.

Figure 6A:
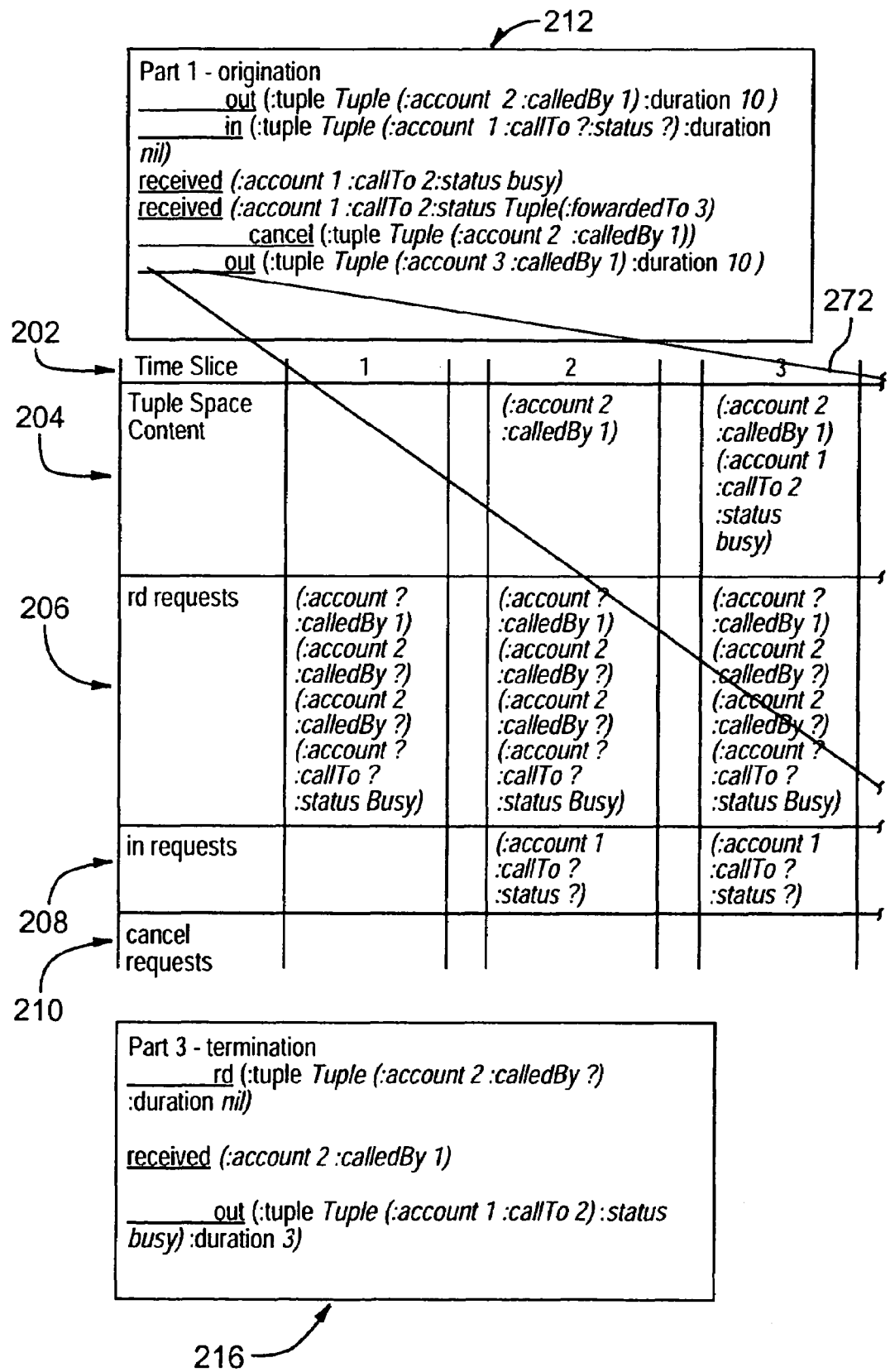
FIG. 6 is a representative schematic drawing illustrating the operation of the synchronized tuple space of the present invention through a fifth time slice in a call processing environment.
Figure 6B:
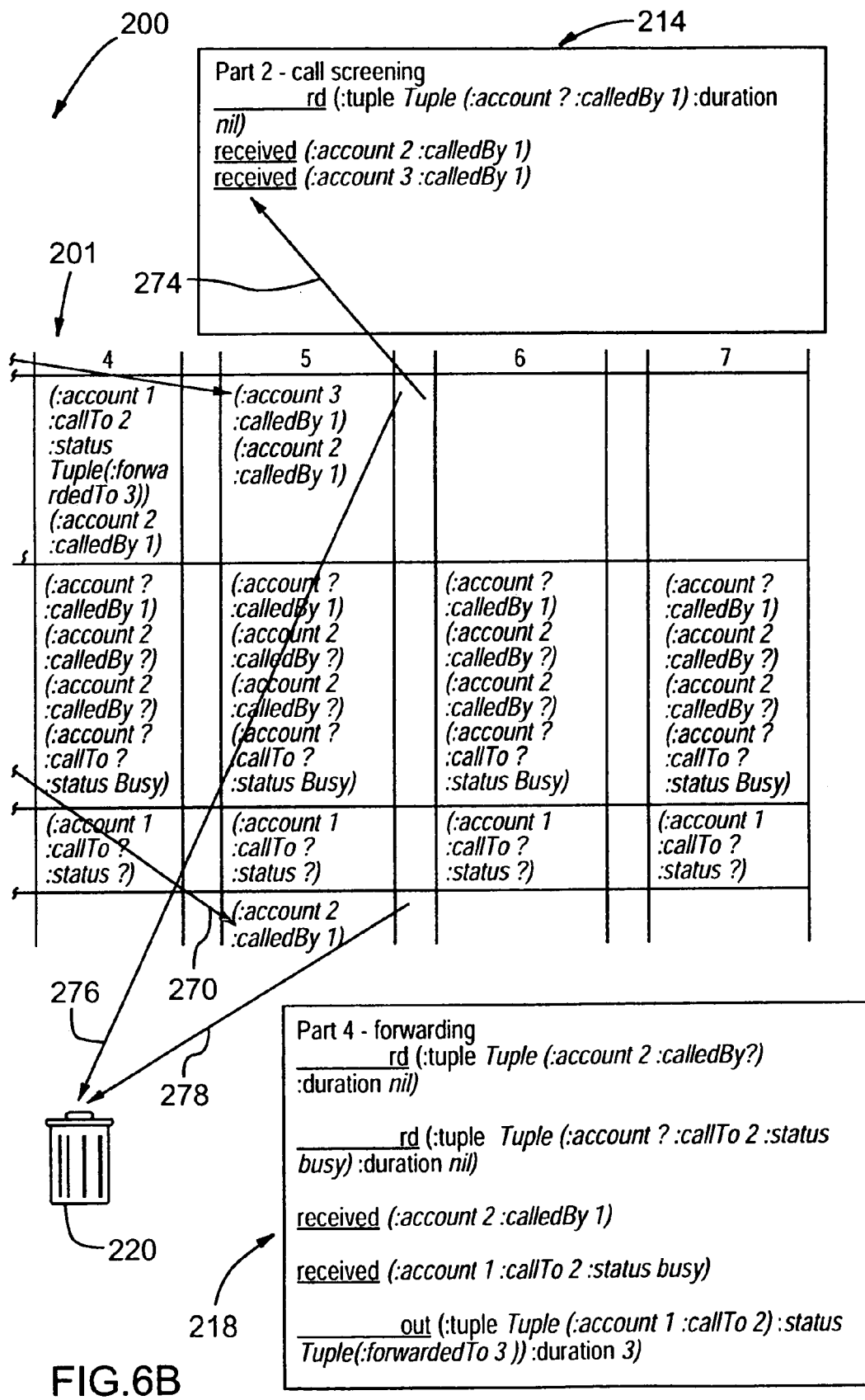

Turning to FIG. 6, at the start of time slice 5, at operation 270, origination entity 212 issues a "cancel" command canceling the call by account 1 to account 2. Origination entity 212, at operation 272, in response to the previously received notice from forwarding entity 218, issues an "out" command placing a call by account 1 to account 3. At the end of time slice 5, at operation 274, call screening entity 214 receives notice of the call by account 1 to account 3. At operation 276, as a result of the tuple and cancel request 210, the call by account 1 to account 2 is discarded in trash 220.

Figure 7A:
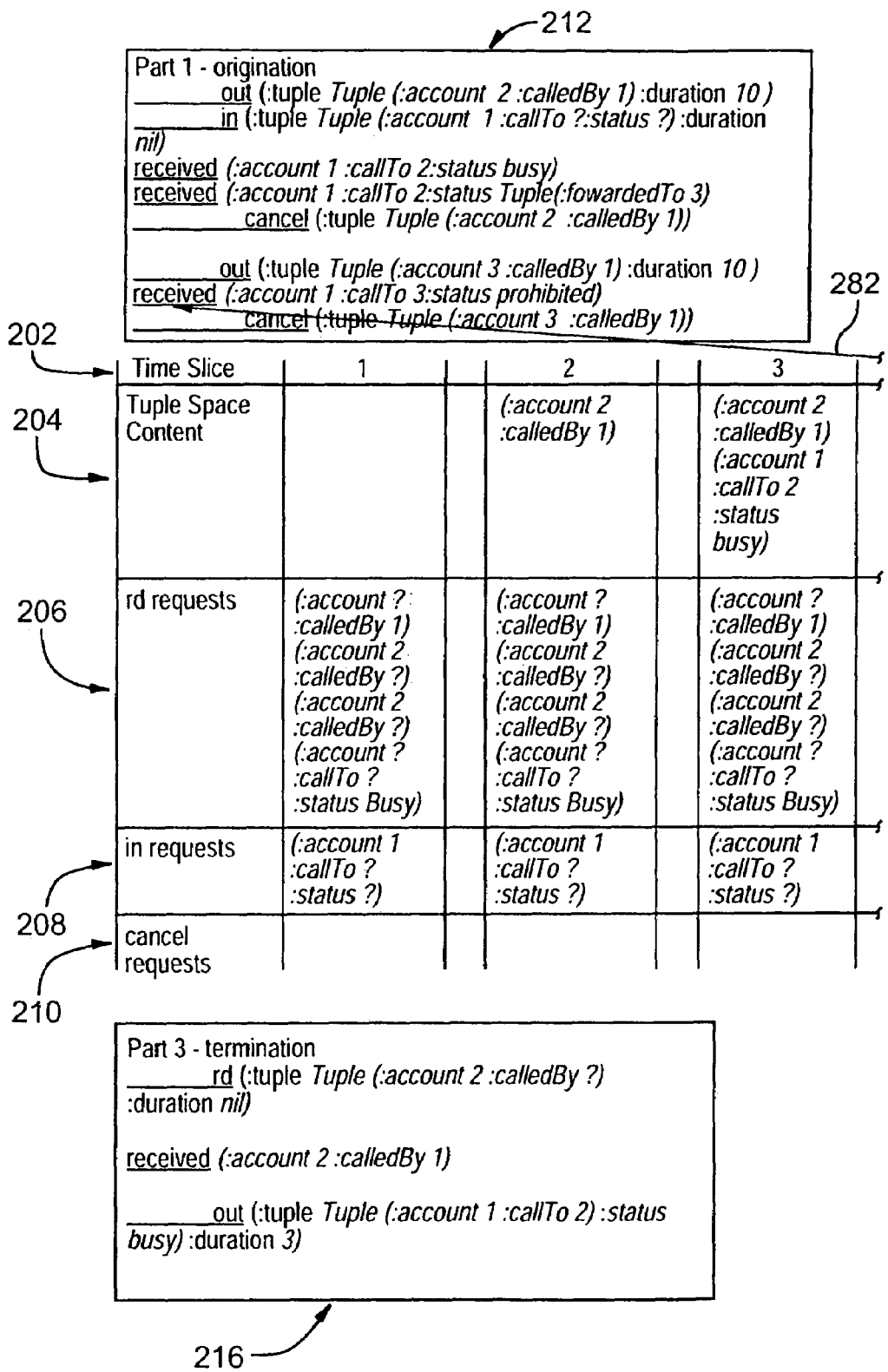
FIG. 7 is a representative schematic drawing illustrating the operation of the synchronized tuple space of the present invention through a sixth time slice in a call processing environment.
Figure 7B:
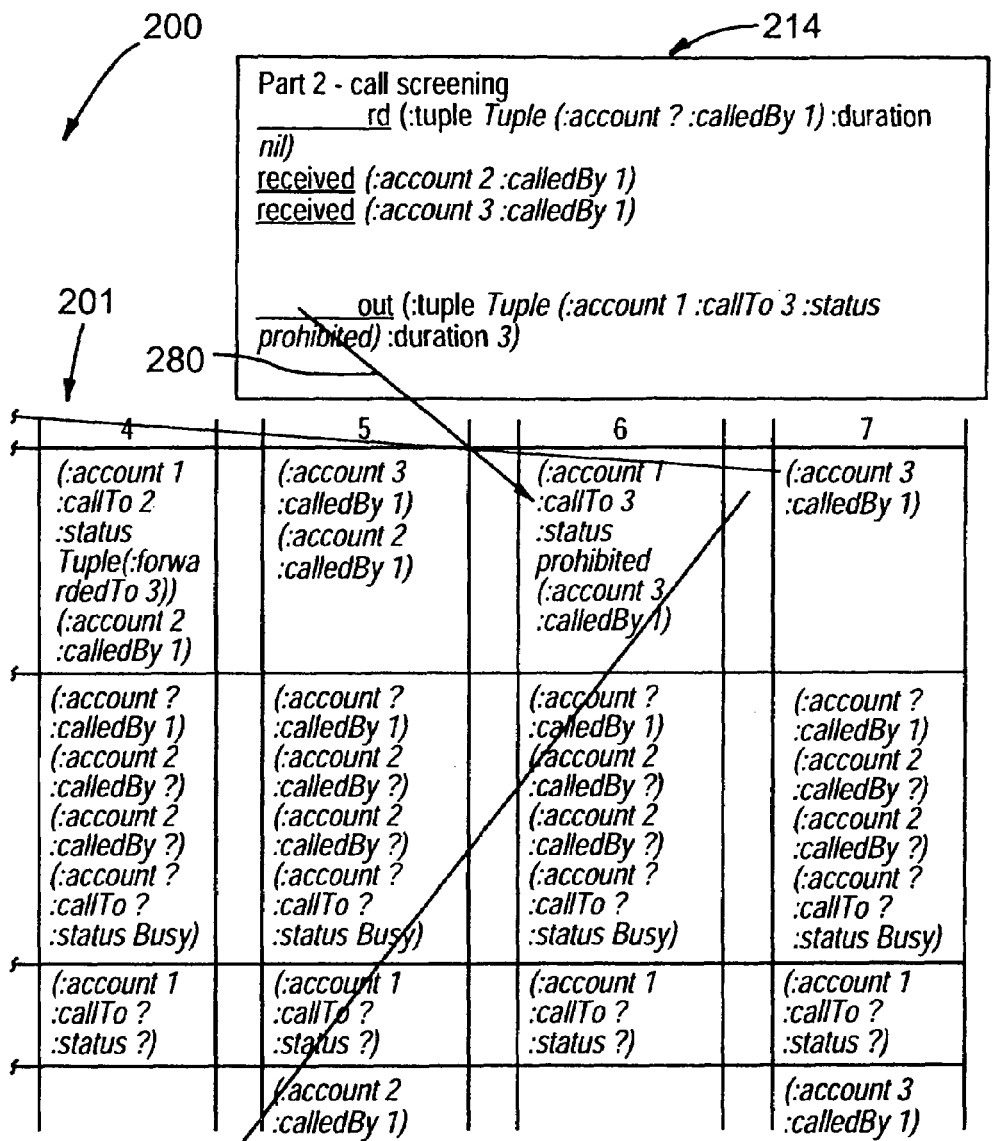
Figure 7B:
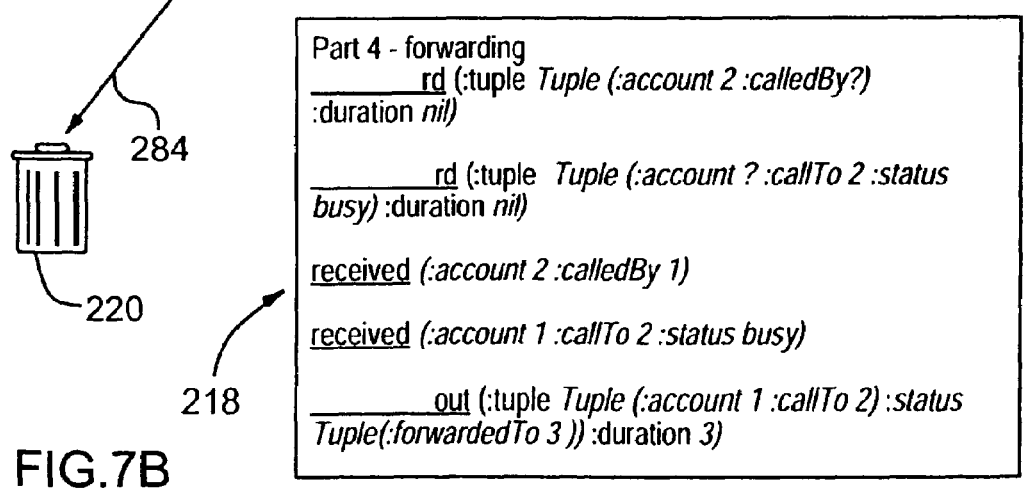

Turning to FIG. 7, at the start at time slice 6, at operation 280, call screening entity 214 issues the "out" command placing a tuple in tuple space content 204 that the call to account 3 from account 1 is prohibited. At the end of time slice 6, at operation 282, origination entity 212 receives notice that the call to account 3 from account 1 has been prohibited. By virtue of in request 218, at operation 284, the tuple in tuple space 204 is discarded in the trash 220.

Figure 8A:
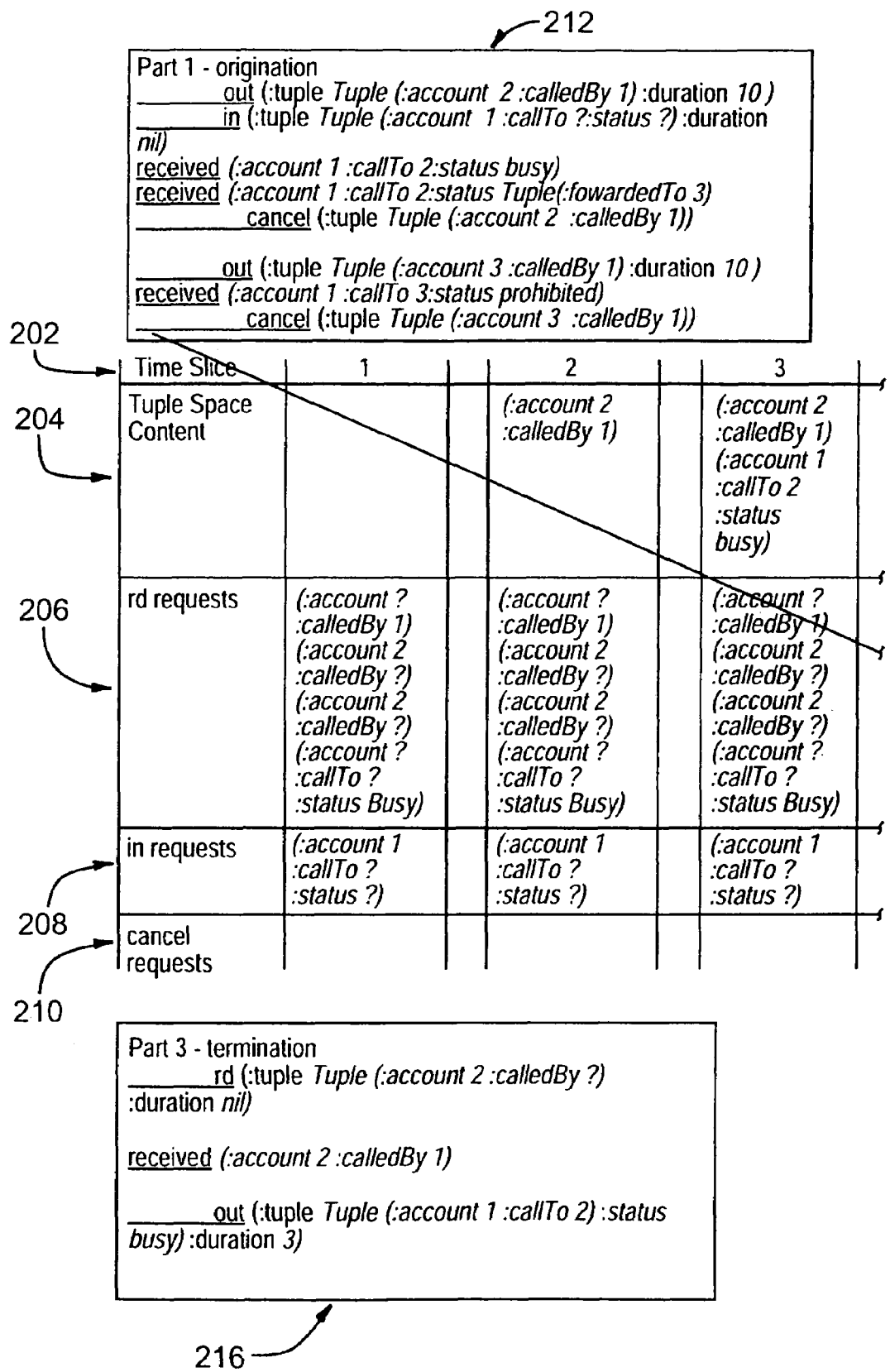
FIG. 8 is a representative schematic drawing illustrating the operation of the synchronized tuple space of the present invention through a seventh time slice in a call processing environment.
Figure 8B:
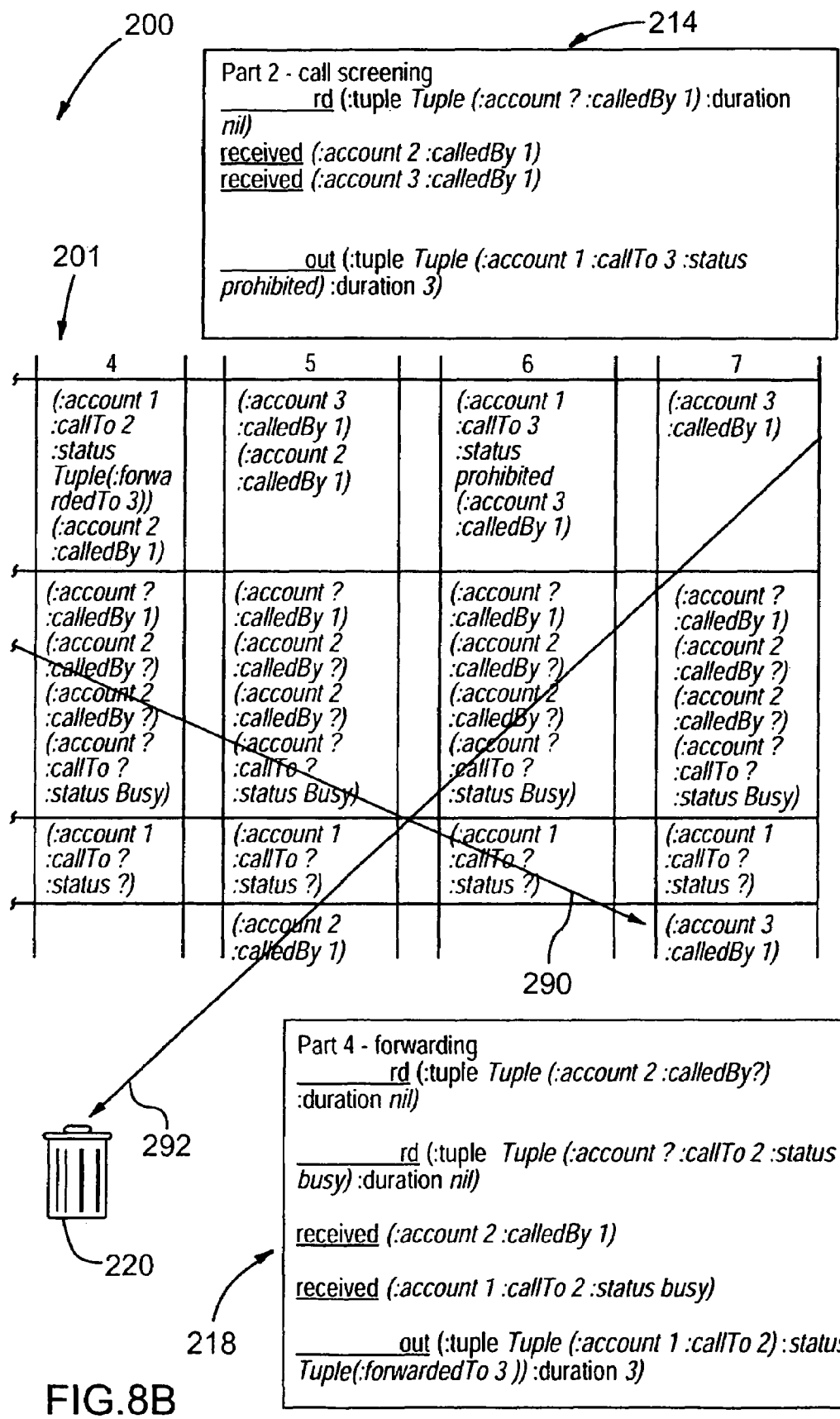

Turning to FIG. 8, at the start of time slice 7, at operation 290, origination entity 212 issues a cancel command placing a tuple in cancel request 210 canceling the call by account 1 to account 3. At the end of time slice 7, the tuple space content 204 is discarded at operation 292 into trash 220.

The tuple space does not accept any new requests until all above is executed. During that time all requests are buffered and processed during next time slice. In this manner, feature interactions can be conveniently, efficiently and effectively managed and resolved.

The present invention can also be used in a contract for service environment.

Figure 9A:
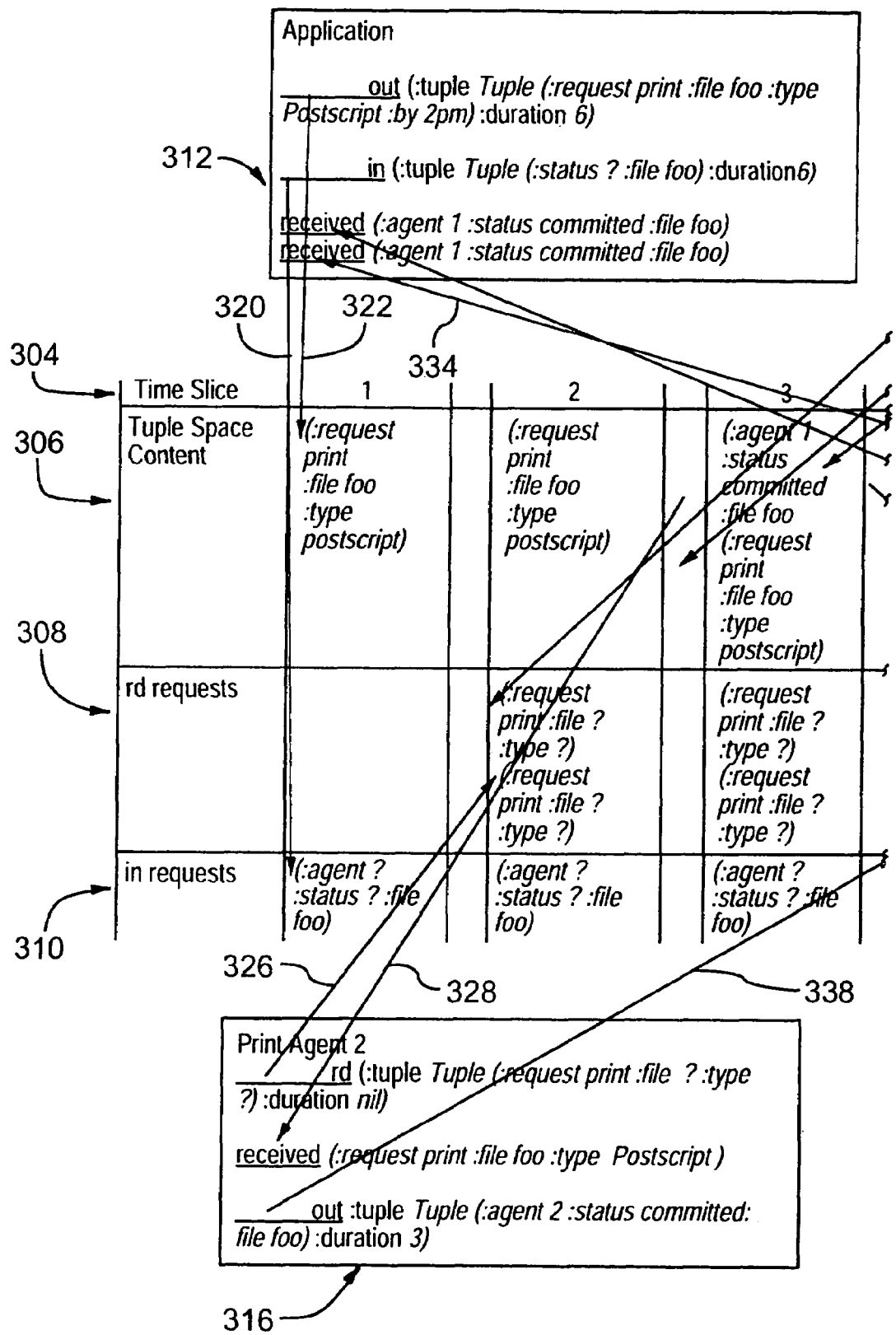
FIG. 9 is a representative schematic drawing of an alternate embodiment of the synchronized tuple space of the present invention in a contract environment in the operation of a printing service.
Figure 9B:
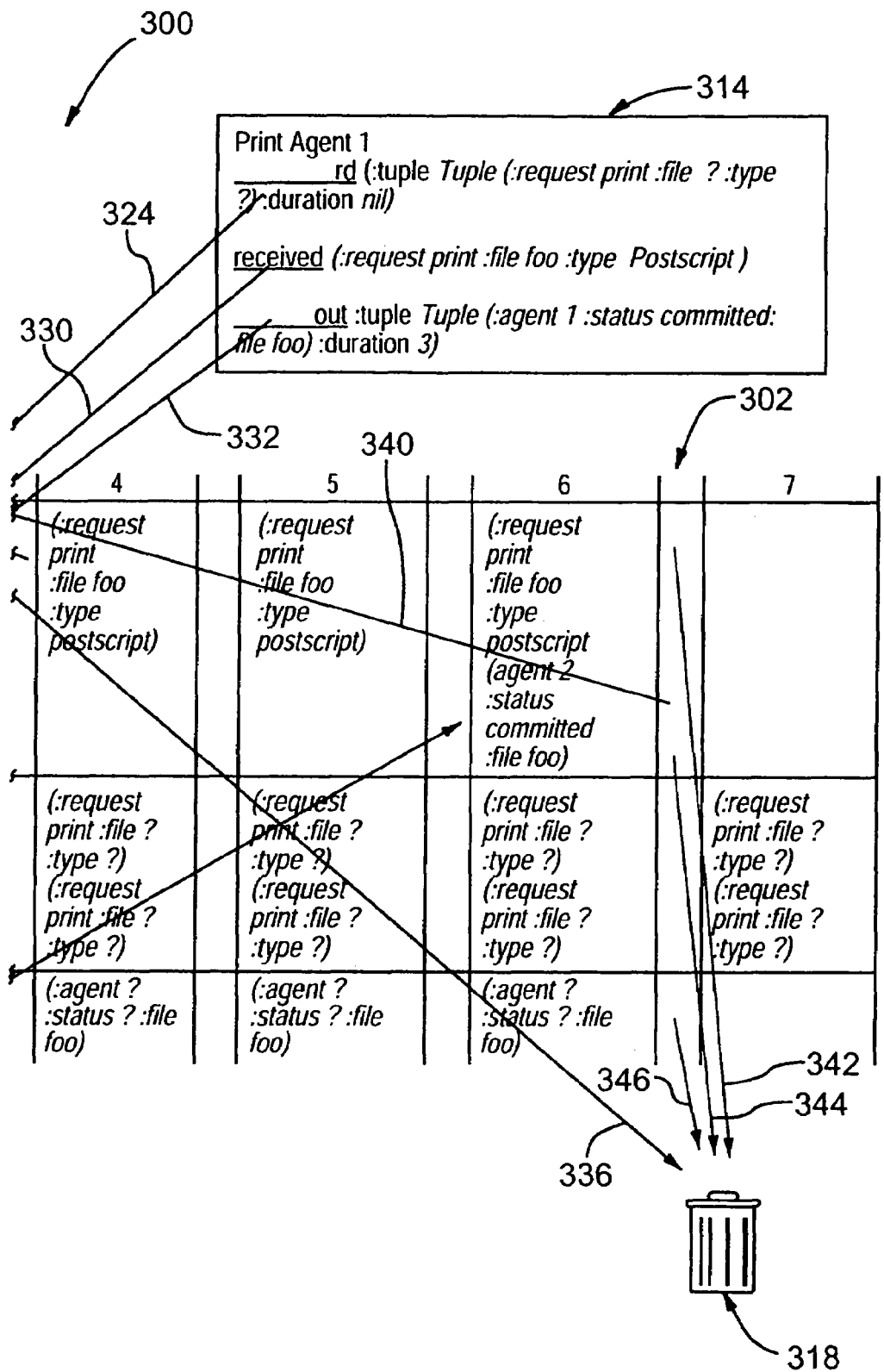

Turning to FIG. 9, the application of the present invention in a contract environment with a printing service and a number of print agents is illustrated. Contract environment 300 contains synchronized tuple space 302. Synchronized tuple space 302 is illustrated with multiple time slices 304 numbered from 1 to 7. For this example, time slices are set at 1 shared increment. Time slices 304 represent segments of time, which may be seconds or parts of seconds and go on infinitely. Synchronized tuple space 302 also has tuple space content 306, read request 308 and in requests 310. Environment 300 also has application 312, print agent 314 and print agent 316. Various items places in tuple space 302 are, when no longer needed, discarded in trash 318. At the start of the first time slice 304, at operation 320, application 312 issues an out command indicating its request to print a file named of type postscript by 2:00 p.m. Also, to keep track of the status of the print request, application 312 issues in command at operation 322 for the status of any operation relating to the file foo.

At the start of time slice 2, print agent 314 issues a read command to be put on notice of any request to print any file of any type. At operation 326, print agent 316 also places a read for requesting notification of any file that is requested to be printed of any type. At the end of the second time slice, at operation 328, print agent 316 receives notice of the request to print file foo of type postscript by virtue of the print request issued by application 312. At operation 330, print agent 314 also receives notification of the print request to print the file foo of type postscript. At the start of time slice 3, print agent 314, being the more efficient print agent, issues an out command indicating that it is committing itself to print the file foo. At operation 332, notice that print agent 314 is received by application 312 that it will commit itself to printing file foo. At operation 336, by virtue of the in request 310, the out command is discarded to trash 318.

Nothing happens at time slice 4 or 5. At the start of time slice 6, print agent 316, being the slower print agent, issues the outcome indicating that it will also commit itself to printing the file foo. At the end of the 6 time slice, at operation 340, application 312 receives notice that agent 316 has committed itself to print the file foo. At operation 342, at the end of the 6 time slice, the request which was placed in synchronized tuple space 302 by application 312 at operation 320 has been resident on the tuple space 302 for a duration of 6 time slices and is discarded. At operation 344, by virtue of in request 310, the out command issued at operation 338 is discarded in trash 318. Finally, the in request 310, issued by application 312 at operation 322, having existed on tuple space 302 for the preset time of 6 time slices is discarded in trash 318.

One practical effect of the synchronized tuple space can be illustrated when we consider a case when tuple space operates with time slice 0.5 second, (not shown). Assume that all response times remain the same as for FIG. 9 (that is, agent 2 takes 6 second to respond). If Agent 1 responds within 1 second, its response arrives on the tuple space during time-slice 6. The response is sent to the application. The response from Agent 2 would arrive at time-slice 13. But by then there is no request for the job on the tuple space having expired and been discarded. It means that the Application never considers the commitment from Agent 2 and Agent 2 has no chance to get the contract for the print job. We can see that reduction of duration of the time slice excludes slow agents. It would favor faster agents and discriminate against slower ones, but gets the job printed quicker.

In a further embodiment, the invention facilitates the ability to ignore advice (override) for business reasons. Since an entity is in charge of its activity, and is only asking the advice of other entities, it is free to ignore the advice and take action as it deems appropriate. This ability to choose a course of action based on its own internal logic is an important part of this new system and method. An extension of this embodiment is that an entity can request the advice of a human user before taking an override action. The entity, through an appropriate user interface will inform the user of the prohibition and seek advice on whether to override the prohibition. This will allow a user to override the prohibitions enforced by the system if the needs of the business require it. Use of the override feature can easily be collected, recorded, logged and reported by an automatic process to a person or authority for monitoring purposes and to prevent abuse. Use of the override feature can be augmented with a password type mechanism. Thus, for example in a call processing environment, if a user requires to make an important international call for an urgent business need and does not have the class of service to do it, he can override the prohibition generated by the system. The use of a synchronized tuple space and the system and method of the present invention is in contrast to prior art systems where prohibitions and overrides are difficult to program directly into the system with multiple features or entities. The clear division of responsibilities provided by the synchronized tuple space of the present invention provides a straightforward and direct path to simplify the implementation of such override capabilities. This allows the system to adapt using human intelligence to the minute to minute needs of the organization. The inability to do such a thing has been one of the major problems of prior art groupware systems.

According to a further aspect of the present invention, Business Rules can be added to Customize the environment to a Particular Owner. Observers could be added as entities with the ability to query the tuple space to obtain information on the state of the processing environment.

The ability to add observers which can support a new feature allows the addition of business rules which are specific to the enterprise to the system gracefully. If a business requires they say no international calls can be placed during night service, an assertion to this effect can be placed in the tuple space which would enforce this business rule. Those shows that the technique can allow the customization of systems to meet the specific business needs of an owner.

The tuple space allows the coordination of components which act at different speeds. Slow and fast components can communicate through the tuple space using the same mechanisms.

Although the invention has been described in terms of the preferred and several alternate embodiments described herein, those skilled in the art will appreciate other embodiments and modifications which can be made without departing from the sphere and scope of the teachings of the invention. All such modifications are intend to be included within the scope of the claims appended hereto.

We claim:

1. A system for controlling and coordinating activities among entities in an information and process environment comprising:
   a) a communications pathway for transmitting and receiving communications of said entities; and
   b) a shared memory connected to said communications pathway for maintaining a tuple space on which said entities post and receive messages, said tuple space synchronized with a clock that defines discrete time intervals as reference points for operations on said tuple space, wherein said entities include at least one entity that asserts a tuple on said tuple space signaling its intention to perform an action and asserts and anti-tuple on said tuple space for evaluating outcomes of said intention; and at least at one further entity which asserts an anti-tuple for detecting said intentions; said system further comprises a process in communication with at least one entity for monitoring said action and, in the event that said entity overrides the evaluated responses, reporting said action to an authority.

2. The system of claim 1 wherein said messages are in the form of tuples and anti-tuples.

3. The system of claim 1, wherein said tuples include a duration parameter for limiting the duration thereof in said tuple space.

4. The system of claim 3 wherein said duration parameter is a multiple of said discrete time intervals.

5. The system of claim 4 wherein said tuples are removed from said tuple space after said duration has elapsed.

6. The system of claim 1 wherein said entities are hardware devices.

7. The system of claim 1 wherein said communication pathway is a network or bus.

8. A method for controlling and coordinating activities among entities in an information and process environment comprising the steps of:
- a) providing a communications pathway for transmitting and receiving communications of said entities;
- b) providing a tuple space in a shared memory, said tuple space synchronized with a clock for operation in discrete time intervals, and connected to said communications pathway; and
- c) using said discrete time intervals as reference points, posting and receiving messages of said entities to and from said tuple space,
- wherein said entities include at least one entity that asserts a tuple on said tuple space signaling its intention to perform an action and asserts and anti-tuple on said tuple space for evaluating responses to said intention; and at least at one further entity which asserts an anti-tuple for detecting said intentions; said method further comprising (d) monitoring said action and, in the event that at least one entity overrides the evaluated responses, reporting said action to an authority.

9. The method of claim 8 wherein said messages are in the form of tuples and anti-tuples.

10. The method of claim 8, wherein said tuples include a duration parameter for limiting the duration thereof in said tuple space.

11. The method of claim 10 wherein said duration parameter is a multiple of said discrete time intervals.

12. The method of claim 11 wherein said tuples are removed from said tuple space after said duration has elapsed.

13. The method of claim 8 wherein said entities are hardware devices.

14. The method of claim 8 wherein said communication pathway is a network or bus.

15. A method of call processing comprising the steps of:
- (a) providing entities representative of call processing features;
- (d) providing a communications pathway for transmitting and receiving communications of said entities;
- (e) providing a tuple space in a shared memory, said tuple space synchronized with a clock for operation in discrete time intervals, and connected to said communications pathway; and using said discrete time intervals as reference points;
- (f) before taking an action, a first of said entities desirous of taking said action requesting advice of other said entities by posting intention messages on said tuple space to said other entities through said pathway;
- (g) in response to said intention messages, said other entities providing advice as desired by posting responding messages on said tuple space to said first of said entities;
- (h) said first of said entities evaluating said responding messages, if any; and
- (i) said first of said entities taking advised action after said evaluating said responding message and monitoring said advised action so that in the event the at least one activity ignores or overrides said responding messages, reporting said advised action to an authority.

16. The method of claim 15 wherein said messages and said responding messages are in the form of tuples and anti-tuples.

17. The method of claim 16 wherein said tuples include a duration parameter for limiting the duration thereof in said tuple space.

18. The method of claim 17 wherein said duration parameter is a multiple of said discrete time intervals.

19. The method of claim 18 wherein said tuples are removed from said tuple space after said duration has elapsed.

20. The method of claim 15 wherein said entities are software processes operating in memory under control of a processor.

21. The method of claim 15 wherein said entities are represented by agents.

22. The method of claim 15 wherein said communication pathway is a network or bus.

23. A method for providing services in an automated contract environment comprising the steps of:
- (a) providing a communications pathway for transmitting and receiving communications of application entities and service entities;
- (b) providing a tuple space in a shared memory, said tuple space synchronized with a clock for operation in discrete time intervals, and connected to said communications pathway; and using said discrete time intervals as reference points, posting and receiving messages of said application entities and said service entities to and from said tuple space, wherein said service entities include at least one entity that asserts a tuple on said tuple space signaling its intention to perform an action and asserts an anti-tuple on said tuple space for evaluating responses to said intention; and at least one further entity which asserts an anti-tuple for detecting said intentions, said method further comprising (c) monitoring said action and in the event that at least one entity overrides the evaluated response reporting said action to an authority.

* * * * *